(12) United States Patent
Schroder et al.

(10) Patent No.: US 8,726,663 B2
(45) Date of Patent: May 20, 2014

(54) COMBINED CYCLE SYSTEM EMPLOYING PHASE CHANGE MATERIAL

(75) Inventors: Mark S. Schroder, Greenville, SC (US); Mark Joseph Steffen, Louisville, KY (US)

(73) Assignee: General Electric Company, Schenectady, NY (US)

( * ) Notice: Subject to any disclaimer, the term of this patent is extended or adjusted under 35 U.S.C. 154(b) by 1172 days.

(21) Appl. No.: 12/652,355

(22) Filed: Jan. 5, 2010

(65) Prior Publication Data

US 2011/0162368 A1   Jul. 7, 2011

(51) Int. Cl.
*F01K 23/06* (2006.01)
*F02C 6/00* (2006.01)
*F02C 7/08* (2006.01)

(52) U.S. Cl.
USPC .......... 60/670; 60/39.15; 60/39.182; 60/39.5; 122/7 R; 122/7 B

(58) Field of Classification Search
USPC ............. 60/39.15, 39.182, 39.5, 39.512, 670, 60/659, 685–697; 122/7 R, 7 B
See application file for complete search history.

(56) References Cited

U.S. PATENT DOCUMENTS

| | | | |
|---|---|---|---|
| 3,977,197 A * | 8/1976 | Brantley, Jr. | ..... 60/659 |
| 4,033,811 A | 7/1977 | Gloersen | |
| 4,112,007 A | 9/1978 | Sanfilippo et al. | |
| 4,152,899 A | 5/1979 | Herrick | |
| 4,154,292 A | 5/1979 | Herrick | |
| 4,209,312 A | 6/1980 | Herrick | |
| 4,215,553 A | 8/1980 | Poirier et al. | |
| 4,319,626 A | 3/1982 | Papazian et al. | |
| 4,427,058 A | 1/1984 | Bell, Sr. et al. | |
| 4,585,925 A | 4/1986 | Andre | |
| 4,593,653 A | 6/1986 | Schneider et al. | |
| 4,700,052 A | 10/1987 | Wolf et al. | |
| 4,708,849 A | 11/1987 | Mielinik, Jr. et al. | |
| 4,913,236 A | 4/1990 | Reed | |
| 4,969,521 A | 11/1990 | Sanchez | |
| 4,992,232 A | 2/1991 | Cowan, II et al. | |
| 5,538,625 A | 7/1996 | Siguad et al. | |
| 5,871,041 A | 2/1999 | Rafalovich et al. | |
| 5,873,250 A | 2/1999 | Lewis et al. | |
| 6,047,106 A | 4/2000 | Salyer | |
| 6,250,978 B1 | 6/2001 | Corliss | |
| 6,328,951 B1 | 12/2001 | White et al. | |
| 6,340,429 B1 | 1/2002 | Minkkinen et al. | |
| 6,400,896 B1 | 6/2002 | Longradner | |
| 6,452,217 B1 | 9/2002 | Wojnarowski et al. | |
| 6,703,127 B2 | 3/2004 | Davis et al. | |
| 7,013,740 B2 | 3/2006 | Dutton et al. | |
| 7,231,835 B2 | 6/2007 | Dutton et al. | |
| 7,512,209 B2 | 3/2009 | Joshi et al. | |
| 7,608,938 B2 * | 10/2009 | Andrew et al. | ..... 290/52 |
| 2009/0211249 A1 * | 8/2009 | Wohrer et al. | ..... 60/641.8 |

* cited by examiner

*Primary Examiner* — Phutthiwat Wongwian
*Assistant Examiner* — Arun Goyal
(74) *Attorney, Agent, or Firm* — Fletcher Yoder, P.C.

(57) ABSTRACT

In one embodiment, a component for a power generation system includes an interior volume for containing steam condensate or gas turbine exhaust gas. A phase change material is disposed around an external surface of the combined cycle power generation system component.

22 Claims, 2 Drawing Sheets

COMBINED CYCLE SYSTEM EMPLOYING PHASE CHANGE MATERIAL

BACKGROUND OF THE INVENTION

The subject matter disclosed herein relates to combined cycle power generation systems, and more specifically, to heat retention in their various components.

Combined cycle systems may generally include one or more gas turbines and steam turbines, which may be used to produce electricity in power plants. Within the gas turbine, fuel may be combusted to generate power. The heated exhaust gas discharged from a gas turbine may be sent to a heat recovery steam generation (HRSG) system as a source of energy, which may be used to produce steam for driving a steam turbine. Within the HRSG system, the heated exhaust gas may traverse a series of heat exchanger elements, such as superheaters, re-heaters, evaporators, economizers, and so forth. The heat exchanger elements may be used to transfer heat from the heated exhaust gas into condensate, which can then become superheated steam.

In general, the HRSG system may operate at a high temperature to produce the high temperature steam. During startup of the combined cycle system, auxiliary heat (outside the combined cycle flow, but within the power plant) may be provided from an auxiliary heating system to elevate the temperatures within the HRSG system to the desired high operating temperatures. When the gas turbine is operating, the exhaust gas may provide sufficient heat to maintain the high operating temperatures. However, the gas turbine may be shutdown at certain intervals, for example, during the night when the demand for electricity is low. During these gas turbine shutdown periods, components of the HRSG system, as well as other combined cycle components, may loose heat to the environment. After a shutdown period, additional heat may be input into the system to account for the heat lost to the environment and to return the HRSG system to the optimal operating temperature for producing high temperature steam. The input of additional heat may increase operating costs due to the use of the aforementioned auxiliary heating system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a power generation system component with an interior volume configured to hold steam condensate or gas turbine exhaust gas, and a phase change material disposed around an external surface of the power generation system component.

In another embodiment, a system includes a heat recovery steam generation system component with an interior volume configured to hold steam condensate, a containment structure disposed about the heat recovery steam generation system component to form an exterior volume between the heat recovery steam generation system component and the containment structure, and a phase change material disposed within the exterior volume.

In yet another embodiment, a heat recovery steam generation system includes a first component system and a second component system. The first component system includes a first component configured to hold steam condensate, and a first phase change material disposed around a first external surface of the first component. The second component system includes a second component configured to hold the steam condensate, and a second phase change material disposed around a second external surface of the second component. The second phase change material is different from the first phase change material.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
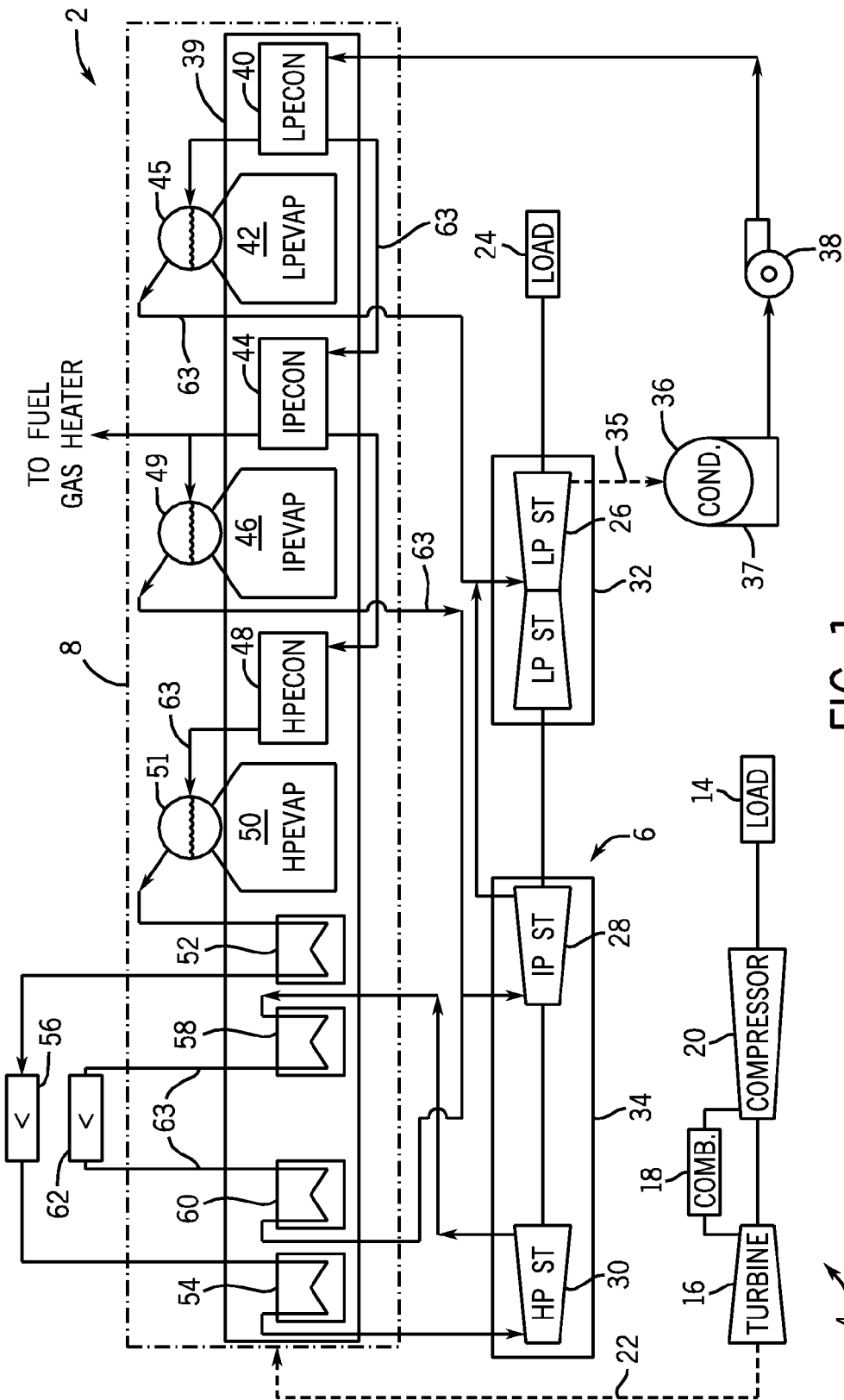
FIG. 1 is a schematic flow diagram of an embodiment of a combined cycle power generation system that may employ phase change materials.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to combined cycle power generation systems that employ phase change materials on one or more system components. The phase change materials may be designed to retain heat within the combined cycle power generation systems. In general, a phase change material may absorb sensible heat at a relatively constant temperature until the phase change material reaches its phase change temperature. As defined herein, the phase change temperature is the temperature at which the material transitions between a solid and a liquid and/or between a liquid and a solid. Upon reaching the phase change temperature, the phase change material may absorb large amounts of latent heat at a fairly constant temperature. For example, when the combined cycle system is operating, temperatures within the combined cycle system may rise above the phase change temperature. Accordingly, the phase change material may absorb enough latent heat to change from a solid to a liquid. The phase change material may then store the latent heat until the temperature falls to at or just below the phase change temperature. For example, when the gas turbine is shutdown, the system may begin to cool and the temperature may decrease. As the temperature decreases, the phase change material may release the latent heat to the combined cycle system as the phase change material transitions from a liquid phase to a solid phase.

The phase change materials may be particularly useful for retaining heat during shutdowns of the gas turbine. For example, combined cycle systems that are used in power plants may include gas turbines that are shutdown at night when the demand for electricity falls. Upon shutdown of the gas turbine, the combined cycle components may begin to lose heat to the environment. However, during operation, heat generated by the gas turbine may be stored within the phase change materials. The stored heat may then be released by the phase change materials, for example, upon shutdown of the gas turbine, which may allow the combined cycle system to remain at a higher temperature for a longer period of time. Maintaining higher temperatures within the combined cycle system may decrease the heat input needed to restart the combined cycle system.

In general, the magnitude of the heat stored within the phase change materials while the phase change materials are in the liquid phase will be a function of the specific heat of the liquid phase of the phase change material. Like most liquids, the retained energy can be quite substantial as compared to solid materials, such as pipe insulation. The stored energy may then be released by the phase change materials to maintain a higher temperature within the combined cycle system upon shutdown of the gas turbine engine.

In addition to the liquid phase energy storage, the phase change materials also may enable HRSG system components to remain at nearly the same temperature for an extended period by utilizing the heat of fusion between liquid and solid phases. For example, when the gas turbine is not operating, the energy within the HRSG system components and the incorporated phase change materials may flow from the hot HRSG system to the environment. Initially, the phase change materials may be in a liquid phase and the temperature of the phase change materials may decrease as energy is released to the environment in accordance with the insulative properties of the HRSG system components. However, when the phase change material reaches the phase change temperature (i.e., the critical temperature), the temperature of the phase change materials may remain constant during energy loss due to the latent heat of fusion as the phase change materials change from a liquid phase to a solid phase. Accordingly, the latent heat of fusion of the phase change materials and/or the storage of heat within the liquid phase of the phase change materials may allow the HRSG components to remain at a higher temperature level for an extended period of time.

In general, the phase change materials may store and release enough energy to allow the combined cycle system to startup in a "hot restart" mode rather than a "warm restart" mode. In the "warm restart" mode, additional heat input, such as from an auxiliary heating system, may be employed to restart the system, while in the "hot restart" mode, no additional heat input may be needed. Accordingly, the use of phase change materials may decrease the use of an auxiliary heating system, which in turn may reduce overall energy consumption. Further, the smaller heat input may allow a power plant to resume operation more quickly, enabling more electricity to be sold. Moreover, in certain embodiments, the smaller heat input may reduce temperature variation during shutdowns, thereby minimizing the thermal stress on system components, which, in turn, may increase the life of the combined cycle components.

FIG. 1 is a schematic flow diagram of an embodiment of a combined cycle power generation system 2 that may employ phase change materials. The system 2 may include a gas turbine 4, a steam turbine 6, and a heat recovery steam generation (HRSG) system 8. Within the gas turbine 4, fuel, such as syngas or natural gas, may be combusted to generate power within a "topping," or Brayton, cycle. Exhaust gas from the gas turbine 4 may be supplied to the HRSG system 8 to generate steam within a "bottoming," or Rankine, cycle. In certain embodiments, the gas turbine 4, the steam turbine 6, and the HRSG system 8 may be included within an integrated gasification combined cycle (IGCC) power plant. As may be appreciated, the components of the combined cycle power generation system 2 are a simplified depiction and are not intended to be limiting. For example, in certain embodiments, additional equipment may be included such as valves, temperature sensors, pressure sensors, controllers, storage tanks, air separation system, and/or gasifiers, among others, may be included.

The gas turbine 4 may combust a fuel (e.g., gas or liquid fuel) to drive a first load 14. The first load 14 may, for instance, be an electrical generator for producing electrical power. The gas turbine 4 may include a turbine 16, a combustor or combustion chamber 18, and a compressor 20. In addition to driving the first load 14, the gas turbine 4 may generate exhaust gas 22. The exhaust gas 22 may be supplied to the steam turbine 6 (through the HRSG system 8) for driving a second load 24. The second load 24 may also be an electrical generator for generating electrical power. However, both the first and second loads 14, 24 may be other types of loads capable of being driven by the gas turbine 4 and steam turbine 6. Further, although the gas turbine 4 and steam turbine 6 may drive separate loads 14 and 24, as shown in the illustrated embodiment, the gas turbine 4 and steam turbine 6 also may be utilized in tandem to drive a single load via a single shaft. In the illustrated embodiment, the steam turbine 6 may include a low-pressure section 26 (LP ST), an intermediate-pressure section 28 (IP ST), and a high-pressure section 30 (HP ST). However, the specific configuration of the steam turbine 6, as well as the gas turbine 4, may be implementation-specific and may include any combination of sections. The low-pressure section 26 and the high-pressure and intermediate-pressure sections 30 and 28 may be enclosed in casings 32 and 34, respectively. The casings 32 and 34 may be designed to direct the steam through the sections 26, 28, and 30. In the illustrated embodiment, the intermediate-pressure and high-pressure sections 28 and 30 are both enclosed within the casing 34. However, in other embodiments, separate casings may be employed for the intermediate-pressure and high-pressure sections 28 and 30.

In addition to driving the second load 24, the steam turbine 6 may produce exhaust steam 35. The exhaust steam 35 may be directed from the low-pressure section 26 of the steam turbine 6 into a condenser 36. The condenser 36 may condense the steam and may include a hotwell 37 that serves as a condensate reservoir for the combined cycle power generation system 2. Condensate from the condenser 36 may, in turn, be directed into a low-pressure section of the HRSG system 8 with the aid of a condensate pump 38.

In general, the HRSG system 8 may employ the exhaust gas 22 from the gas turbine 4 to heat the condensate to produce steam used to power the steam turbine 6. As the condensate flows through the HRSG system 8, the condensate may be heated by the exhaust gas 22 from the gas turbine 4. Specifically, the exhaust gas 22 may flow through an enclosure or ductwork 39 included within the HRSG system 8 and may transfer heat to the condensate flowing through equipment, such as economizers, evaporators, superheaters, and re-heaters, among others, included within the ductwork 39. The ductwork 39 may generally define an exhaust gas flow path through the HRSG system 8 where the exhaust gas 22 may flow through the HRSG system 8 from areas containing the hottest steam condensate and/or the hottest steam to the cooler steam condensate.

Within the HRSG system 8, the condensate may flow through a low-pressure economizer 40 (LPECON), where the condensate may be heated. From the low-pressure economizer 40, the condensate may either be directed into a low-pressure evaporator 42 (LPEVAP) or toward an intermediate-pressure economizer 44 (IPECON). The low-pressure evaporator 42 may include a steam drum 45, which holds the condensate as the condensate is heated to produce steam. Steam from the low-pressure evaporator 42 may be returned to the low-pressure section 26 of the steam turbine 6. Likewise, from the intermediate-pressure economizer 44, the condensate may either be directed into an intermediate-pressure evaporator 46 (IPEVAP) or toward a high-pressure economizer 48 (HPECON). The intermediate-pressure evaporator 46 may include a steam drum 49, which holds the condensate as the condensate is heated to produce steam. Steam from the intermediate-pressure evaporator 46 may be sent to the intermediate-pressure section 28 of the steam turbine 6. Further, steam from the intermediate-pressure economizer 44 also may be sent to a fuel gas heater (not shown) where the steam may be used to heat fuel gas for use in the combustion chamber 18 of the gas turbine 4.

Finally, condensate from the high-pressure economizer 48 may be directed into a high-pressure evaporator 50 (HPEVAP). The high-pressure evaporator 50 may include a steam drum 51, which holds the condensate as the condensate is heated to produce steam. Steam exiting the steam drum 51 may be directed into a primary high-pressure superheater 52 and a finishing high-pressure superheater 54, where the steam is superheated and eventually sent to the high-pressure section 30 of the steam turbine 6. Exhaust from the high-pressure section 30 of the steam turbine 6 may, in turn, be directed into the intermediate-pressure section 28 of the steam turbine 6, and exhaust from the intermediate-pressure section 28 of the steam turbine 6 may be directed into the low-pressure section 26 of the steam turbine 6.

An inter-stage attemperator 56 may be located in between the primary high-pressure superheater 52 and the finishing high-pressure superheater 54. The inter-stage attemperator 56 may allow for more robust control of the exhaust temperature of steam from the finishing high-pressure superheater 54. Specifically, the inter-stage attemperator 56 may be configured to control the temperature of steam exiting the finishing high-pressure superheater 54 by injecting cooler feedwater spray into the superheated steam upstream of the finishing high-pressure superheater 54 whenever the exhaust temperature of the steam exiting the finishing high-pressure superheater 54 exceeds a predetermined value.

In addition, exhaust from the high-pressure section 30 of the steam turbine 6 may be directed into a primary re-heater 58 and a secondary re-heater 60 where it may be re-heated before being directed into the intermediate-pressure section 28 of the steam turbine 6. An inter-stage attemperator 62 may be located between the re-heaters 58 and 60 to control the exhaust steam temperature from the re-heaters 58 and 60. Specifically, the inter-stage attemperator 62 may be configured to control the temperature of steam exiting the secondary re-heater 60 by injecting cooler feedwater spray into the superheated steam upstream of the secondary re-heater 60 whenever the exhaust temperature of the steam exiting the secondary re-heater 60 exceeds a predetermined value. As may be appreciated the HRSG system 8 and the components therein are provided by way of example only, and are not intended to be limiting. For example, in other embodiments, the number, layout, types, and combinations of the re-heaters 58 and 60, superheaters 52 and 54, attemperators 56 and 62, economizers 40, 44, and 48, evaporators 42, 46, and 50, and steam drums 45, 49, and 51 may vary.

In combined cycle systems such as system 2, hot exhaust may flow from the gas turbine 4 and pass through the HRSG system 8 and may be used to generate high-pressure, high-temperature steam. Within the HRSG system 8, the hot exhaust may flow through the ductwork 39 and transfer heat to the condensate flowing through HRSG system components, such as the economizers 40, 44, and 48, the evaporators 42, 46, and 50, the superheaters 52 and 54, and the re-heaters 58 and 60. Piping 63 may connect the equipment and the exhaust gas also may transfer heat to the condensate flowing through the piping located within the ductwork 39. Portions of the piping 63 and certain HRSG system components, such as the steam drums 45, 49, and 51 and the inter-stage attemperators 56 and 62, may be located outside of the ductwork 39, and therefore, may not contact the hot exhaust gas 22. According to certain embodiments, the phase change materials may be applied to components disposed outside of the ductwork 39. For example, the phase change materials may be disposed around the external surfaces of the steam drums 45, 49, and 51, around external surfaces of the inter-stage attemperators 56 and 62, and/or around the external surfaces of the piping 63 located outside of the ductwork 39. The phase change materials also may be disposed around other combined cycle components, such as the condenser hotwell 37 and/or the steam turbine casings 32 and 34.

The phase change material may be selected and/or specifically engineered to have phase change temperatures corresponding to the system component operating temperatures. For example, according to certain embodiments, the high-pressure steam drum 51 may have an operating temperature of at least approximately 260° C.; the intermediate-pressure steam drum 49 may have an operating temperature that is approximately 100 to 200° C. less than the high-pressure steam drum operating temperature; and the low-pressure steam drum 45 may have an operating temperature that is approximately 200 to 300° C. less than the high-pressure steam drum operating temperature. In this embodiment, different phase change materials may be disposed around each of the steam drums 51, 49, and 45, with each phase change material having a phase change temperature corresponding to the respective operating temperatures. For example, the phase change material disposed around the high-pressure steam drum 51 may have a phase change temperature of at least approximately 260° C.; the phase change material disposed around the intermediate-pressure steam drum 49 may have a phase change temperature that is approximately 100 to 200° C. less than the phase change temperature of the high-pressure steam drum phase change material; and the phase change material disposed around the low-pressure steam drum 45 may have a phase change temperature that is approximately 200 to 300° C. less than the phase change temperature of the high-pressure steam drum phase change material.

In another example, the intermediate-pressure steam drum 49 may have an operating temperature that is approximately 65% of the operating temperature of the high-pressure steam drum 51, and the low-pressure steam drum 45 may have an operating temperature that is approximately 40% of the operating temperature of the high-pressure steam drum 51. In this example, different phase change materials may be disposed around each of the steam drums 51, 49, and 45. The phase change temperature of the phase change material disposed around the intermediate-pressure steam drum 49 may be approximately 65% of the operating temperature of the high-pressure steam drum 51. The phase change temperature of the phase change material disposed around the low-pressure steam drum 45 may be approximately 40% of the operating temperature of the high-pressure steam drum 51. In other embodiments, the relative percentages of the different phase change materials may vary. For example, in certain embodiments, the phase change temperatures may vary by approximately 10-90 percent, and all subranges therebetween. More specifically, the phase change temperatures may vary by approximately 30-70 percent, and all subranges therebetween.

Phase change materials may be disposed around various combinations of components, such as the steam drums, 45, 49, 51, the condenser hotwell 37, the steam turbine casings 32 and 34, the inter-stage attemperators 56 and 62, and the piping 63, within the combined cycle system 2. Further, according to certain embodiments, phase change materials may be disposed at least around the hottest components within the combined cycle system 2 as these high temperature components may be prone to the largest amount of heat loss. For example, the phase change material may be disposed around the high-pressure steam drum 51. However, in other embodiments, any combination of components may include phase change materials of the same or different types. According to one embodiment, the combined cycle system 2 may include a phase change material with a phase change temperature of at least approximately, 180° C., 200° C., 230° C., or 260° C. As noted above, the phase change materials may allow thermal energy to be retained within the combined cycle system for a longer period of time. Further, in certain embodiments, the phase change materials may be designed to release stored thermal energy upon shutdown of the gas turbine system, thereby allowing the combined cycle system 2 to maintain a higher temperature for a longer time during shutdown of the gas turbine system. As discussed above, the higher temperatures may reduce energy consumption and startup times.

The phase change materials may be installed around the system components during initial installation of the combined cycle system 2. Further, according to certain embodiments, existing system components may be retrofit to include phase change materials. For example, phase change materials may be installed around existing piping 63. In another example, certain components, such as the steam drums 45, 49, or 51, the inter-stage attemperators 56 and 62, and/or the condenser hotwell 37 may be replaced during a plant shutdown by components including the phase change materials.

Figure 2:
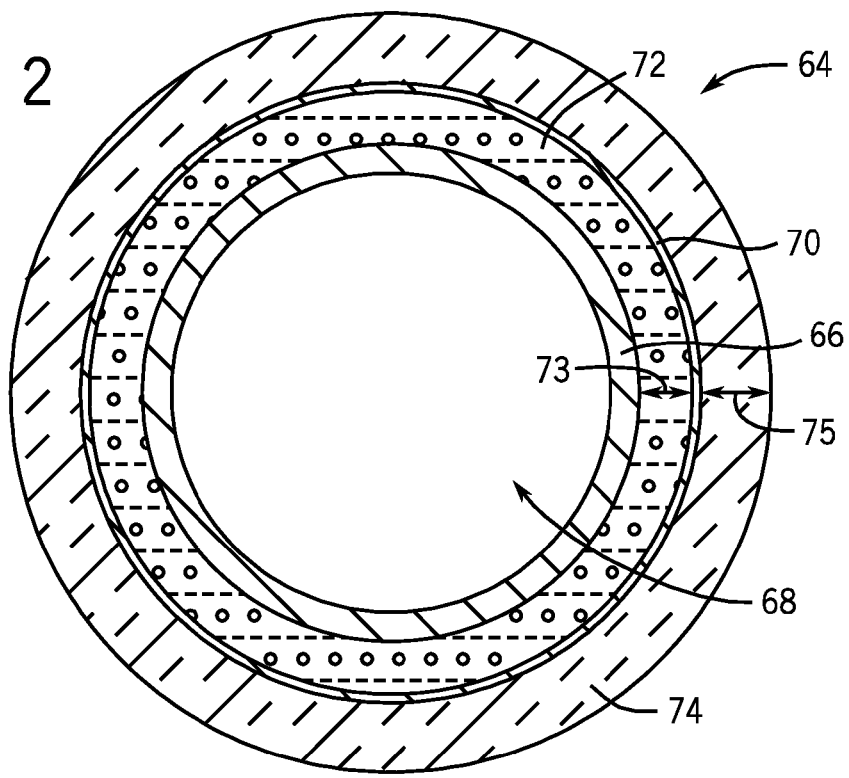
FIG. 2 is a cross-sectional view of an embodiment of a component of the combined cycle power generation system of FIG. 1.

FIG. 2 is a cross sectional view of a combined cycle component system 64 taken through a component 66 that may be employed in the combined cycle system 2, shown in FIG. 1. The component 66 may represent a steam drum 45, 49, or 51, a condenser hotwell 37, a steam turbine casing 32 or 34, an inter-stage attemperator 56 or 62, or piping 63 disposed outside of the HRSG ductwork 39 as shown in FIG. 1. The component 66 defines an interior volume 68 that may hold condensate and/or steam. Further, in other embodiments, the component 66 may represent the ductwork 39 (FIG. 1) and the interior volume 68 may contain exhaust gas from the gas turbine 4. In general, the component 66 may be a large-scale component containing one or more hot fluids (e.g., liquid and/or gas). According to certain embodiments, the interior volume may be at least approximately 20 to 190,000 liters, and all subranges therebetween. Moreover, in certain embodiments, the interior volume 68 may be at least 1,800 liters (500 gallons), 3,800 liters (1,000 gallons), 19,000 liters (5,000 gallons), or 190,000 liters (50,000 gallons). Further, according to certain embodiments, the dimensions of the component 66 that defines the interior volume 68 may be at least approximately 2 meters by 2 meters by 6 meters.

A containment structure 70 may be disposed around the component 66 to form an exterior volume 71 between the external surface of the component 66 and the containment structure 70. The exterior volume 71 may contain a phase change material 72. The phase change material 72 may be disposed around the component 66 at a thickness 73 that may generally correspond to the width of the exterior volume 71. As noted above, the phase change material 72 may be specifically engineered to have a phase change temperature corresponding to the operating temperature within the component 66. According to certain embodiments, the phase change material 72 may have a phase change temperature that is within plus or minus 1, 5, 10, or 15 percent of the operating temperature within the component 66. The phase change material may be an organic phase change material, such as a thermal salt, paraffin, or a fatty acid, among others, or may be an inorganic material, such as a salt hydrate. According to certain embodiments, the phase change material 72 may be an aliphatic organic compound. The phase change material may be any suitable form, such as a liquid, gel, paste, powder, or granule format. Further, according to certain embodiments, the phase change material may include a microencapsulated powder or liquid slurry, which may prevent water evaporation or uptake, particularly when organic thermal salts are employed as the phase change material.

The phase change material 72 may be contained within the containment structure 70, which may be constructed of sheet metal, or other suitable material. According to certain embodiments, the containment structure 70 may include an air release valve or opening that facilitates initial installation of the phase change material 72 within the exterior volume 71. For example, in certain embodiments, the phase change material 72 may be heated to the liquid phase to facilitate installation. The air release valve or opening may then allow air to be released as the phase change material 72 is pumped, sprayed, or poured, among other techniques, into the exterior volume 71. Upon cooling, the phase change material 72 may solidify in the interior volume 71. Further, the interior volume 71 may be a continuous space or may be subdivided to form internal chambers. Moreover, in certain embodiments, stiffeners, or other supports, may connect the containment structure 70 to the component 66 to support the containment structure 70.

Insulation 74 may be disposed around the containment structure 70. According to certain embodiments, the insulation may be applied in a wet state and rolled or wrapped onto the containment structure 70. The insulation 74 may then harden into a rigid state as the insulation dries. According to certain embodiments, the insulation may include a needled refractory fiber blanket and inorganic binding agents. For example, the insulation may be Cerafiber® Wet Pack commercially available from Thermal Ceramics of Augusta, Ga. However, in other embodiments, any suitable insulation may be used. In general, the insulation 74 may be designed to reduce the rate of heat transfer from component system 64 to the environment. The insulation 74 may have a low thermal conductivity in order to retain heat within the component system 64. The insulation 74 also may have properties such as freeze-thaw stability (e.g., freezing does not significantly affect its strength) and reduced surface binder migration (e.g., binder particles within the insulation are inhibited from migrating toward the surface).

The insulation may be disposed around the containment structure 70 at a thickness 75. In certain embodiments, the insulation thickness 75 may be approximately 12 to 35 centimeters and all subranges therebetween. However, in other embodiments, any suitable thickness 75 may be employed. Moreover, the relative thicknesses 73 and 75 of the phase change material 72 and the insulation 74 may vary depending on the properties of the phase change material 72 and/or the insulation 74. For example, according to certain embodiments, the phase change material 72 may be engineered to have a phase change temperature that corresponds to the operating temperature within the interior volume 68. According to certain embodiments, the phase change material 72 may have a phase change temperature that is within plus or minus 1, 5, 10, or 15 percent of the operating temperature within the interior volume 68. Further, in certain embodiments, the phase change material 72 may be designed to have a phase change temperature that is approximately 1-100° C. below the operating temperature within the interior volume 68, and all subranges therebetween. More specifically, the phase change material 72 may be designed to have a phase change temperature that is approximately 5-50° C. below the operating temperature within the interior volume 68, and all subranges therebetween.

The other properties of the phase change material, such as the thermal conductivity, the specific heat, and the latent heat of fusion may be dependent on the designed phase change temperature. These other properties may determine the thickness 73 of the phase change material. For example, if the phase change material has a relatively low heat of fusion, the thickness 73 may be increased to allow more thermal energy to be retained by the phase change material. The thickness 75 of the insulation 74 also may depend on the properties of the phase change material 72. For example, if the phase change material 72 has a relatively high thermal conductivity, the insulation 74 may be disposed at an increased thickness 75 to slow the rate of heat transfer to the environment.

As noted above with respect to FIG. 1, when the combined cycle system 2 is operating, the phase change material 72 may absorb heat from the interior volume 68 to change from a solid phase to a liquid phase. The phase change material 72 may then remain in the liquid phase until the temperature of the interior volume 68 drops to at or just below the phase change temperature. For example, temperature of the interior volume 68 may decrease when the gas turbine is shut down. As the temperature of the interior volume 68 decreases, the phase change material may release stored latent heat to the component 66, thereby heating the interior volume 68 and the component 66. As the phase change material 72 releases heat, the phase change material 72 may transition from a liquid phase to a solid phase. The release of heat from the phase change material 72 may allow the temperature of the interior volume 68 and the component 66 to remain at a higher temperature after shutdown of the gas turbine. When the gas turbine is started again and the interior volume temperature begins to rise, the phase change material 72 may absorb sensible heat until the phase change material approaches the phase change temperature. Upon approaching the phase change temperature, the phase change material 72 may absorb latent heat to transition from a solid phase to a liquid phase.

Figure 3:
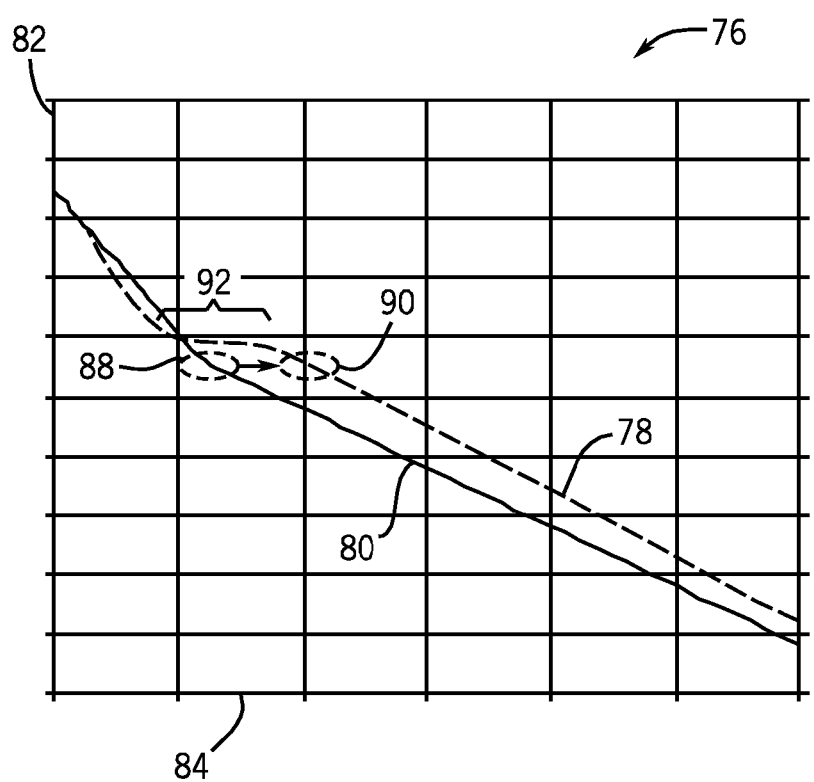
FIG. 3 is a graph depicting an embodiment of a temperature profile for a component of the combined cycle power generation system of FIG. 1.

FIG. 3 is a graph 76 depicting temperature profiles 78 and 80 for a component of a combined cycle system, such as the combined cycle system 2 shown in FIG. 1. For example, the component may be the high-pressure steam drum 51, shown in FIG. 1. The temperature profile 78 depicts a component with phase change material disposed around the component, while the temperature profile 80 depicts the temperature profile for the same component without the phase change material. The graph 76 includes a y-axis 82 that represents the component temperature and an x-axis 84 that represents the elapsed hours since shutdown of the gas turbine. Each temperature profile 78 and 80 includes a transition point 88 and 90 that represents a transition temperature. The transition temperature may generally represent the temperature below which a warm restart rather than a hot restart may be employed.

As shown on the graph 76, the temperature profile 80, representing the component without the phase change material, has a transition point 88 that occurs several hours after shutdown, while the temperature profile 78, representing the component with the phase change material, has a transition point 90 that does not occur until approximately many more hours after shutdown. The increased time before the transition point 90 occurs due to a relatively flat portion 92 of the temperature profile 78. The relatively flat portion 92 may generally correspond to the phase change of the phase change material from a liquid phase to a solid phase. Accordingly, the phase change material may allow the component to remain at a higher temperature for a longer period of time, which may decrease the number of warm starts and allow more hot starts to occur.

As described above, increased hot starts may reduce the use of an auxiliary heating system and/or may allow the power plant to begin producing electricity sooner after a shutdown. According to certain embodiments, the phase change material may decrease the heat transfer rate to the environment by at least approximately 30 to 50 percent, and all subranges there between. As may be appreciated, the temperature profiles 78 and 80 are shown by way of example only, and are not intended to be limiting. In other embodiments, the shape of the temperature profiles, the temperature values, and the elapsed time values, may vary depending on operating conditions, design conditions, component materials, and phase change materials, among others.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a power generation system component with an interior volume configured to hold a fluid that receives energy from a gas turbine exhaust during operation of a power generation system; and
   a phase change material disposed around an external surface of the power generation system component; and
   a containment structure surrounding the power generation system component, wherein the containment structure forms an exterior volume between the containment structure and the power generation system component;
   wherein the phase change material is disposed within the exterior volume and is configured to absorb energy from the fluid during operation of the power generation system having the power generation system component and to heat the fluid in the power generation system component after shutdown of the power generation system.

2. The system of claim 1, wherein the power generation system component comprises a heat recovery steam generation system duct, a steam drum, a heat recovery steam generation system pipe, a steam turbine casing, or a condenser hotwell.

3. The system of claim 1, wherein the power generation system component comprises a hotwell of a condenser configured to condense steam from a steam turbine.

4. The system of claim 1, wherein the power generation system component comprises a steam drum of a heat recovery steam generation system.

5. The system of claim 1, wherein the power generation system component comprises an interior volume of at least approximately 1800 liters.

6. The system of claim 1, comprising a gas turbine, a steam turbine, and a heat recovery steam generation system.

7. The system of claim 1, wherein the phase change material is configured to release stored latent heat.

8. The system of claim 1, wherein the power generation system component comprises a heat recovery steam generation system, comprising:
a first component system comprising:
a first component configured to hold the steam condensate; and
a first phase change material disposed around a first external surface of the first component; and
a second component system comprising:
a second component configured to hold the steam condensate; and
a second phase change material disposed around a second external surface of the second component, wherein the second phase change material is different from the first phase change material, wherein the first phase change material and the second phase change material have different phase change temperatures.

9. A system, comprising:
a first heat recovery steam generation system component with a first interior volume configured to hold a first steam condensate that receives energy from a gas turbine exhaust during operation of a power generation system;
a first containment structure disposed about the first heat recovery steam generation system component to form a first exterior volume between the first heat recovery steam generation system component and the first containment structure;
a first phase change material disposed within the first exterior volume;
a second heat recovery steam generation system component with a second interior volume configured to hold a second steam condensate that receives energy from the gas turbine exhaust during operation of the power generation system;
a second containment structure disposed about the second heat recovery steam generation system component to form a second exterior volume between the second heat recovery steam generation system component and the second containment structure; anda second phase change material disposed within the second exterior volume.

10. The system of claim 9, wherein the first or second heat recovery steam generation system components comprise a steam drum or a steam pipe.

11. The system of claim 9, wherein the first phase change material comprises a first phase change temperature that is within ten percent of a first operating temperature within the first containment structure when the first heat recovery steam generation system component is operational, and the second phase change material comprises a second phase change temperature that is within ten percent of a second operating temperature within the second containment structure when the second heat recovery steam generation system component is operational.

12. The system of claim 9, wherein at least one of the first or second phase change materials comprise an organic phase change material.

13. The system of claim 9, wherein at least one of the first or second phase change materials comprise a phase change temperature of at least 260degrees Celsius.

14. The system of claim 9, wherein the first and second phase change materials are configured to absorb heat from the respective first and second heat recovery steam generation system components to change from a solid phase to a liquid phase.

15. The system of claim 9, comprising insulation disposed about the first and second containment structures.

16. The system of claim 9, comprising a heat recovery steam generation system, wherein the first and second heat recovery steam generation system components are disposed outside of an exhaust gas flow path within the heat recovery steam generation system.

17. The system of claim 9, wherein the first and second phase change materials are configured to absorb energy during operation of a power generation system having the first and second heat recovery steam generation system components, and wherein the first phase change material heats a first fluid in the first heat recovery steam generation system component and the second phase change material heats a second fluid in the second heat recovery steam generation system component after shutdown of the power generation system.

18. the system of claim 17, wherein the first and second phase change materials are different, and the first phase change material and the second phase change material have different phase change temperatures.

19. A heat recovery steam generation system, comprising:
a first component system comprising:
a first component configured to hold steam condensate that receives energy from a gas turbine exhaust during operation of a power generation system; and
a first phase change material disposed around a first external surface of the first component; and
a second component system comprising:
a second component configured to hold the steam condensate that receives energy from the gas turbine exhaust during operation of the power generation system; and
a second phase change material disposed around a second external surface of the second component, wherein the second phase change material is different from the first phase change material.

20. The heat recovery steam generation system of claim 19, wherein the first phase change material and the second phase change material have different phase change temperatures.

21. The heat recovery steam generation system of claim 19, wherein the first phase change material comprises a first phase change temperature that is approximately 40-65 percent of a second phase change temperature of the second phase change material.

22. The heat recovery steam generation system of claim 19, wherein the first phase change material comprises a first phase change temperature that is within ten percent of a first operating temperature of the first component during operation of the heat recovery steam generation system, and wherein the second phase change material comprises a second phase change temperature that is within ten percent of a second operating temperature of the second component during operation of the heat recovery steam generation system.

* * * * *